United States Patent [19]
Mendon

[11] Patent Number: 5,794,957
[45] Date of Patent: Aug. 18, 1998

[54] TRAILER FOR A WHEELCHAIR

[75] Inventor: Stephen P. Mendon, Salida, Colo.

[73] Assignee: Avibank Mfg., Inc., Burbank, Calif.

[21] Appl. No.: 615,035

[22] Filed: Mar. 12, 1996

[51] Int. Cl.⁶ ................................................. B62K 27/00
[52] U.S. Cl. ................................ 280/204; 280/304.1
[58] Field of Search ........................... 280/304.1, 292, 280/304.5, 204, 288.4, 503, 656, 250.1, 33.992

[56] References Cited

U.S. PATENT DOCUMENTS

| | | | |
|---|---|---|---|
| 3,787,065 | 1/1974 | Grimm | 280/204 |
| 3,792,875 | 2/1974 | Paden | 280/204 |
| 3,877,723 | 4/1975 | Fahey et al. | 280/204 |
| 4,305,601 | 12/1981 | Berge | 280/289 |
| 4,371,184 | 2/1983 | Henden et al. | 280/204 |
| 4,548,423 | 10/1985 | Craven | 280/492 |
| 4,679,807 | 7/1987 | Raybon | 280/65 |
| 4,756,541 | 7/1988 | Albitre | 280/204 |
| 4,795,182 | 1/1989 | Dyess et al | 280/289 |
| 4,928,985 | 5/1990 | Nowlin | 280/204 |
| 5,171,034 | 12/1992 | Scott | 280/204 |

FOREIGN PATENT DOCUMENTS

| | | | |
|---|---|---|---|
| 2030863 | 5/1992 | Canada | 280/204 |
| 4227632 | 2/1994 | Germany | 280/204 |

*Primary Examiner*—Paul N. Dickson
*Attorney, Agent, or Firm*—Oppenheimer Wolff & Donnelly LLP

[57] ABSTRACT

A lightweight towable trailer for a wheelchair having a quick disconnect support member attachable to the frame of a wheelchair. The trailer is wheeled and pivotable about the wheelchair. A basket for carrying items is supported between the sides of the trailer.

14 Claims, 4 Drawing Sheets

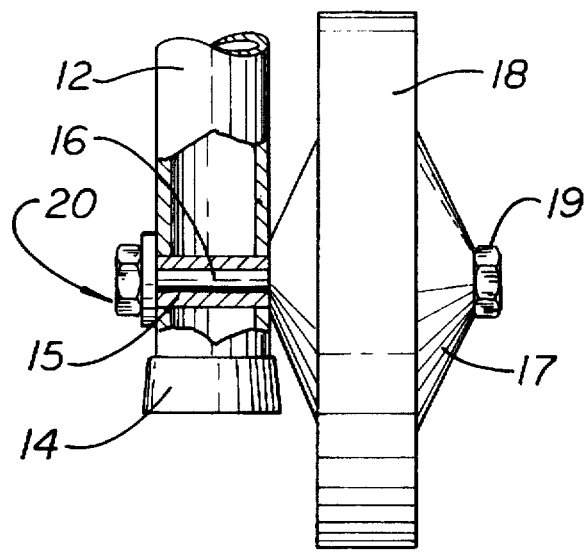
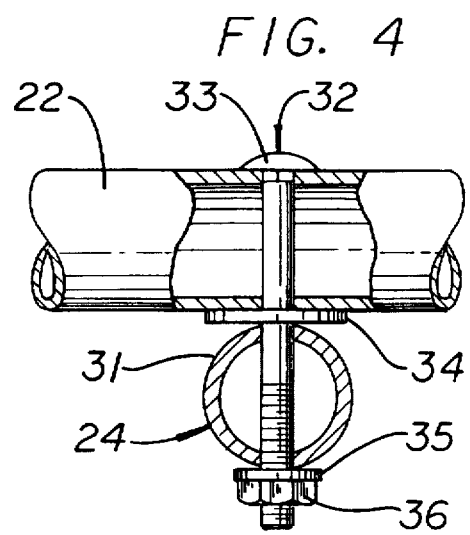
FIG. 3A
FIG. 4
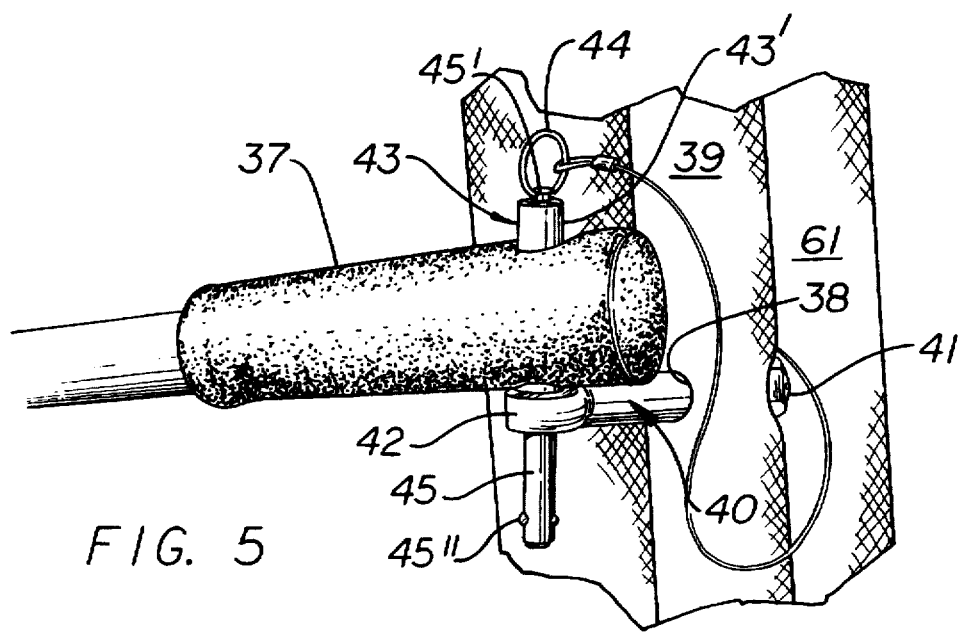
FIG. 5

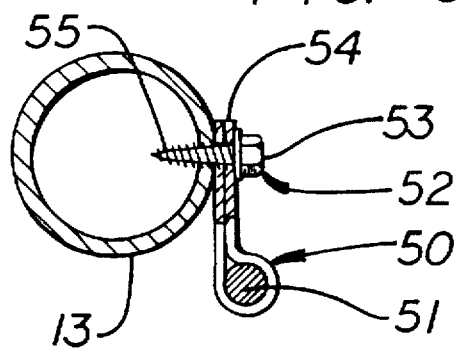
FIG. 6
FIG. 7
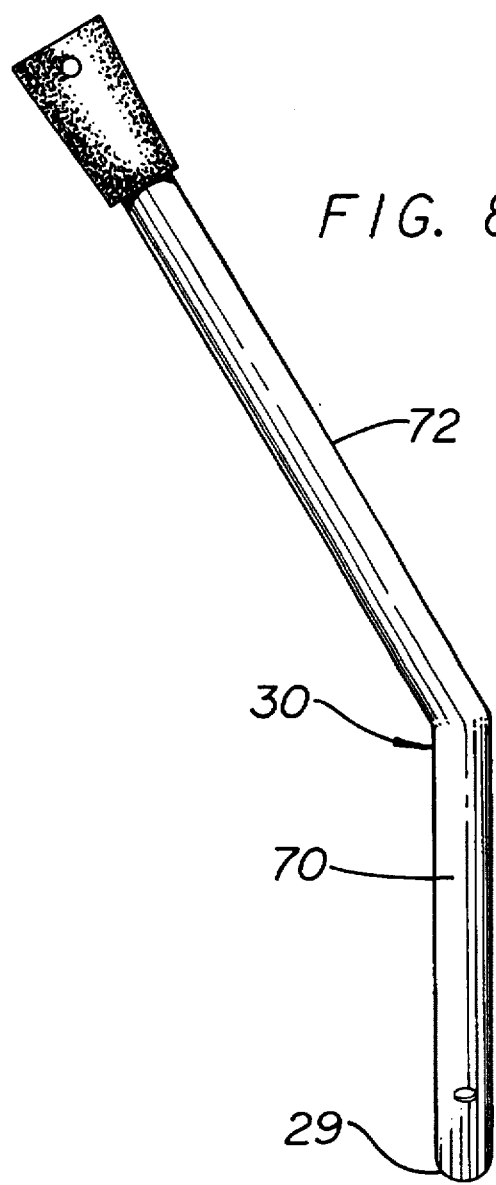
FIG. 8
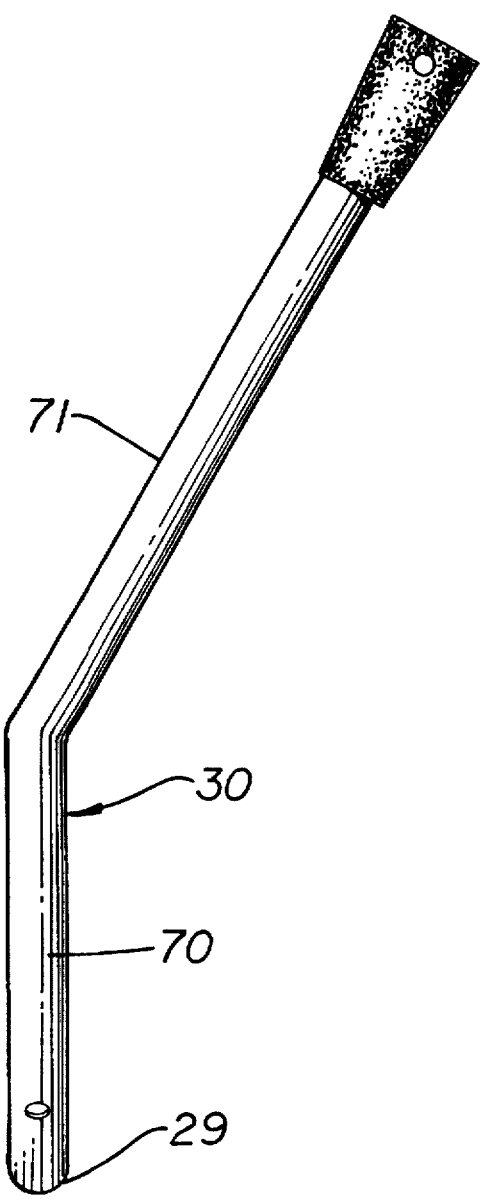

TRAILER FOR A WHEELCHAIR

BACKGROUND OF THE INVENTION

1. Field of the Invention

The invention relates to trailers for wheelchairs towable behind a wheelchair.

2. Description of the Prior Art

Various types of baskets or the like attachable to wheelchairs have been proposed in the past. One such arrangement is disclosed in U.S. Pat. No. 4,795,182 to Dyess, et al. In this patent, a wheelchair is provided including a forward transversely extending support mounted at one forward corner of the wheelchair for angular displacement about a horizontal axis for movement between a closed position extending between opposite side forward corner positions of the wheelchair and an open position projecting forwardly of the aforementioned one forward corner portion of the wheelchair, the other forward corner portion of the wheelchair and the support including coacting structure for releasably latching the support in the closed position and supporting the adjacent portion of the support against downward deflection relative to the wheelchair as a result of a load being supported by the support.

However, a basket in front of the wheelchair user impairs one's vision and may be dangerous to use as the wheelchair user, who may not have full control of his or her faculties, will not be able to see curves, parking bumps, etc.

There is thus a need for a lightweight trailer towed by a wheelchair that can be quickly and easily connected thereto or disconnected therefrom.

SUMMARY OF THE INVENTION

It is an object of this invention to provide a trailer which can be towed rearwardly of a wheelchair, yet pivoted quickly and easily next to the user.

It is a further object of this invention to provide such a trailer that can be quickly and easily connected to or disconnected from a wheelchair.

It is still further an object of this invention to provide a trailer for connection to a wheelchair which can be attached to either the left hand side or the right hand side of the wheelchair.

These and other objects are preferably accomplished by providing a lightweight towable trailer for a wheelchair having a quick disconnect support member attachable to the frame of a wheelchair. The trailer is wheeled and pivotable about the wheelchair. A basket for carrying items is supported between the sides of the trailer.

BRIEF DESCRIPTION OF THE DRAWING

FIG. 4 is a detailed cross-sectional view taken on line 4 of FIG. 2;

FIG. 5 is an elevational view of a portion of the wheelchair and trailer assembly of FIG. 1 showing attachment of trailer 11 to wheelchair 10.

FIG. 6 is a detailed cross-sectional view taken on line 6 of FIG. 3;

FIG. 7 is a top plan view of tubing sections 29, 30 alone; and

FIG. 8 is a view similar to FIG. 7 showing another angular relation of the tubing sections 29, 30.

DESCRIPTION OF THE PREFERRED EMBODIMENT

Figure 1:
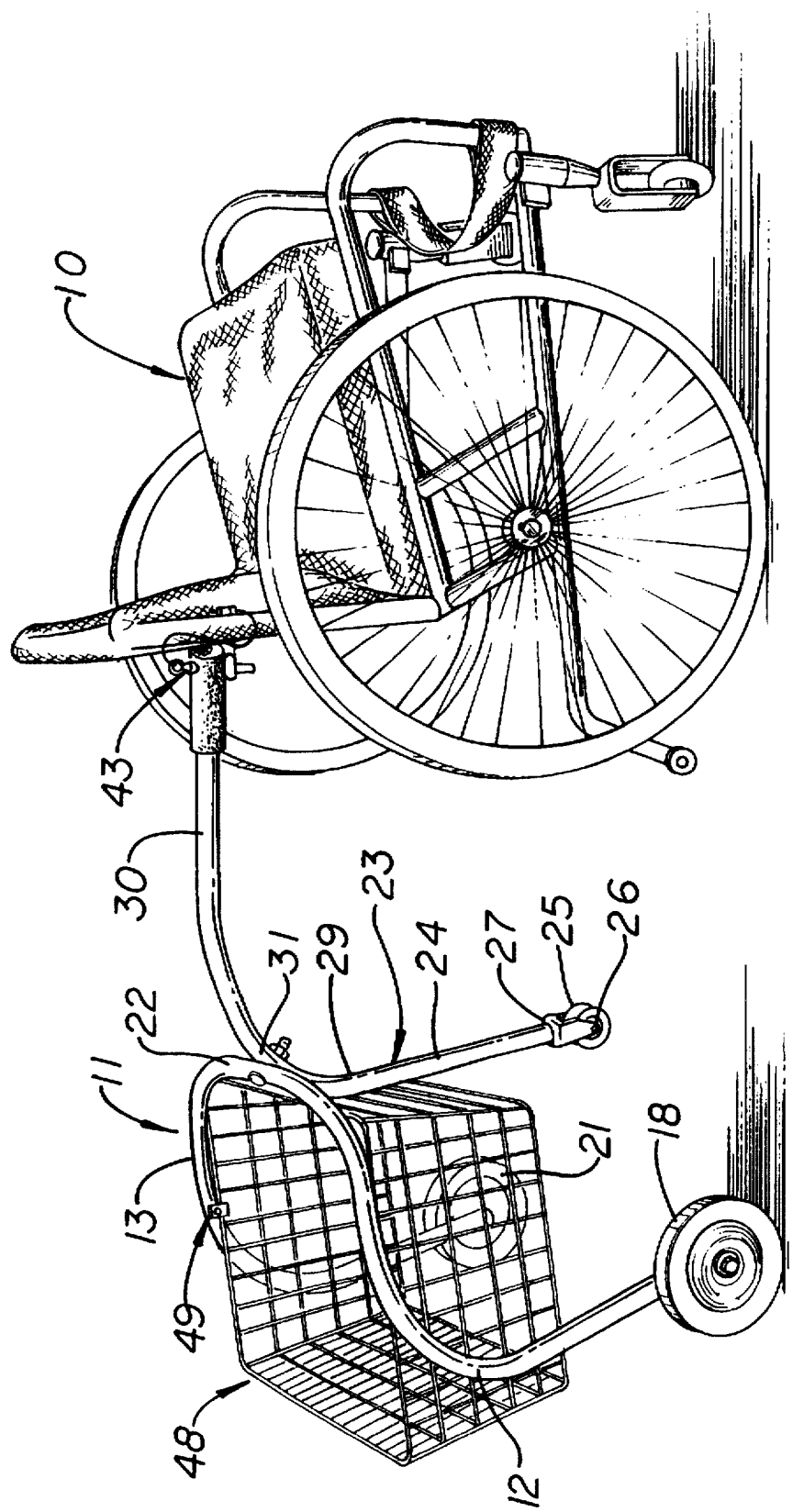
FIG. 1 is a perspective view of a wheelchair having a trailer coupled thereto in accordance with the teachings of the invention.

Referring now to FIG. 1 of the drawing, a conventional wheelchair 10 is shown towing a trailer 11 in accordance with the teachings of the invention. Trailer 11 is shown in elevational view in FIG. 2 and includes a pair of curved spaced sides 12, 13 (see FIG. 3). Each side 12, 13 is identical and closed off at bottom by a protective cap 14, such as of rubber, and each has a hole therethrough above cap 14 receiving a sleeve 15 in press fit relationship. An axle 16 extends through sleeve 15 and is rotatable therein and also extends through the hub 17 (FIG. 2) of a wheel 18. Wheel 18 is fixed to axle 16 for rotation and a conventional cap screw 19 is mounted on the end of axle 16 extending out of wheel 18. A conventional washer and lock nut assembly 20 (FIG. 3) secures the free end of axle 16 which extends out of sleeve 15 on the opposite side of side 12. An identical wheel 21 is mounted to the terminal end of side 13 and secured thereto in like manner, like numerals referring to like parts of the assembly.

Figure 2:
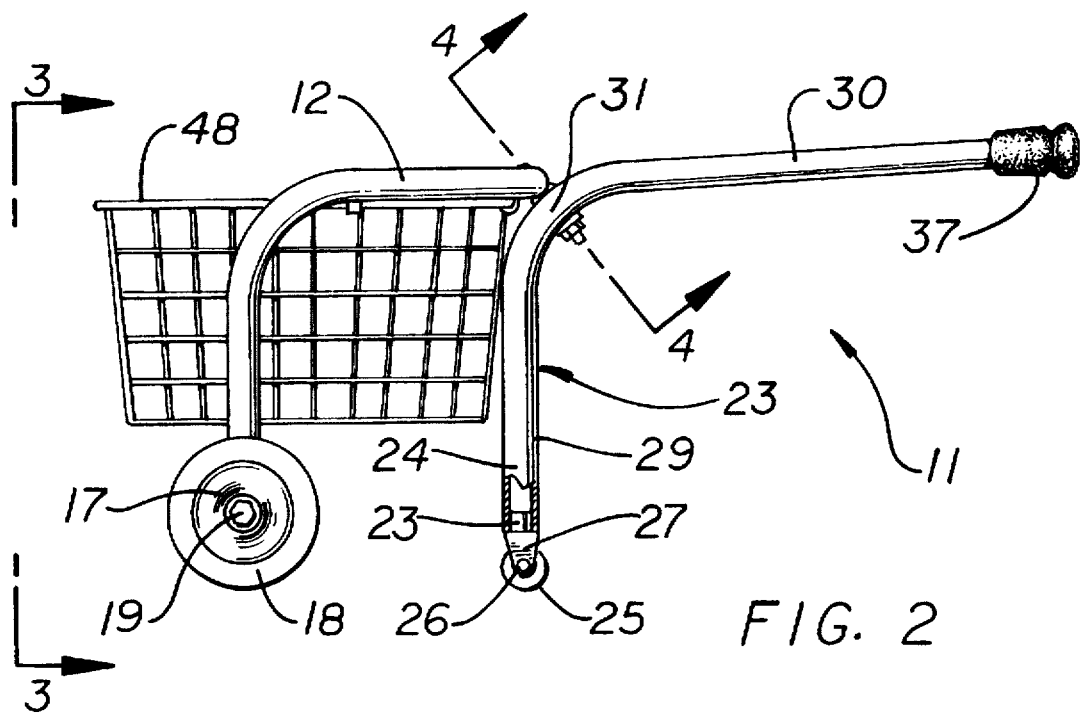
FIG. 2 is an elevational view, partly in section, of the trailer alone of FIG. 1.
Figure 3:
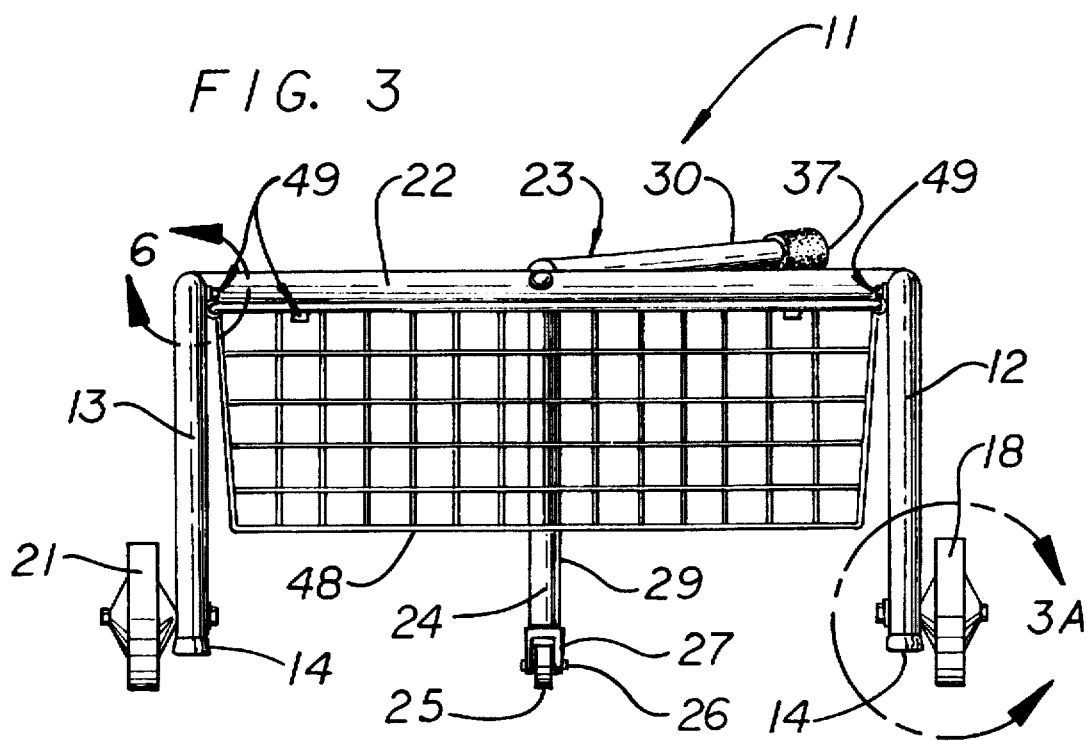
FIG. 3 is a view taken along lines 2—2 of FIG. 2.

As seen in FIG. 2, side 12 (and like side 13 not visible in FIG. 2) are generally L-shaped and curved at the intersection of the legs thereof. As seen in FIG. 1, sides 12, 13 curve inwardly forming an elongated section 22. Sides 12, 13, and section 22, may be one integral piece of tubing.

A support leg assembly 23 secures the trailer 11 to wheelchair 10 simultaneously supporting sides 12, 13 and section 22. Support leg assembly 23 includes a first elongated support leg 24 (see also FIG. 2) terminating at bottom in a wheel 25. Wheel 25 is journalled for rotation on axle 26 within a yoke member 27 press fit or otherwise secured to leg 24 (which may be of hollow tubing) as is well known in the art. That is, yoke member 27 may have an upwardly extending extension portion 23 (FIG. 2) press fit into the lower end of hollow tubing leg 24.

Leg 24 is generally L-shaped in cross-section having a first lower portion 29 and a second upper portion 30. As seen in FIG. 2, second upper portion 30 may be angled from the horizontal, e.g., about 5°.

The intersection portion 31 of portions 29, 30 is joined to the middle of section 22 as seen in FIG. 4. A conventional carriage screw 32 extends through aligned holes in sections 22 and intersection portion 31. Screw 32 has an enlarged head 33 at one end with a washer 34 disposed between section 22 and portion 31. A conventional washer 35 and lock nut 36, is threaded to the free end of screw 32, secures the same in position. Carriage screw 32 allows leg 24 to pivot about section 22.

The means for securing trailer 11 to wheelchair 10 will now be described. As seen in FIG. 2, an end cap 37 closes off tubing portion 30 remote from wheel 25.

A conventional ball-lock pin assembly, of the type described and claimed in U.S. Pat. Nos. 5,394,594; 4,404,714; 3,793,685; 3,138,393; 2,461,699; and 3,276,799, the teachings of which are incorporated herein by reference, may be used to quickly disconnect the trailer 11 from wheelchair 10. Thus, the wheelchair 10, which may be any suitable conventional wheelchair has a hole 38 (FIG. 5) through a suitable vertical support member, such as upright 39. A connecting bolt 40 extends through hole 38 having an enlarged hex head 41 and one end a rounded apertured bearing portion 42 at the other end (see also FIG. 2). As seen particularly in FIGS. 2 and 3, quick disconnect bolt assembly 43 includes a ring portion 44 which may be grasped so that pin 45, coupled thereto, may be pushed inwardly to release the quick disconnect bolt assembly 43 from bearing portion 42 as is well known in the quick disconnect art.

A wire basket 48 is mounted between sides 12, 13 and section 22. As seen in FIG. 1, clamping means 49 may be used to secure basket 48 to sides 12, 13 and section 22. As seen in FIG. 6, clamping means 49 include a conventional cable clamp 50 encircling the upper wire frame portion 51 of basket 48 and doubling on itself to form an apertured end 54 receiving a conventional self-drilling screw 52 therethrough. The enlarged head 53 of screw 52 abuts against end 54, and the elongated screw shaft 55 extends through and into the tubing forming section 22 and sides 12, 13 at a plurality of spaced locations.

Referring again to FIG. 5, it can be seen that bolt 40 is secured to upright 39 and angled outwardly away therefrom. Finally, as seen in FIG. 5, the terminal end of tubing portion 30 may be cushioned, as at cushion 61, for comfort.

As seen in FIG. 7, elongated portion 30 may have a first portion 70, extending from vertical portion 29, then curving outwardly at an angle to form second portion 71. This angle may be about 30°. As seen in FIG. 8, wherein like numerals refer to like parts of FIG. 7, second portion 72 curves in a direction opposite that shown in portion 71 in FIG. 7. This allows the trailer to be attached either for left hand or right hand use.

Although a quick release pin, which may be spring biased and released from bearing member 42 by pulling or lifting ring 44 has been disclosed, any suitable quick disconnect may be used. Any suitable materials may be used, such as lightweight and durable aluminum tubing of 0.875" diameter and 0.39 inches wall thickness. Any suitable dimensions may be used, such as sides about 16" high and 14" wide with leg 24 about 14.4" high and portion 30 about 13" long with a radius of curvature of about 42°.

It can be seen that there is described a wheelchair which is detachable and pivotable about the wheelchair. The trailer has an offset arm which pivotally connects at any suitable location to the conventional wheelchair. The offset arm allows the trailer to be towed along with the wheelchair, then be swung or pivoted around next to the user to be adjacent to the seat and allow the user to put items in or take items out of the wheelchair.

The foregoing arrangement provides more freedom and independence for the wheelchair user. One can carry alongside groceries, books, sports equipment, picnic supplies, tools, camping equipment and more. A 170° turn allows close easy access to the trailer without abnormal teaching. The trailer can be made of durable lightweight tubing and thus may weigh only 12.5 pounds yet carry 40 pounds. The lightweight trailer can be thrown in the car when one travels. Small size wheels may be used which will not get in one's way. A quick release mounts to the wheelchair back allowing the trailer instantly to be attached or unattached without the help of others. It is trouble-free and easy and allows superior maneuverability.

In conclusion, a trailer for a wheelchair having a quick disconnect bolt which may be used to quickly disconnect the trailer from the wheelchair.

A caster wheel in front of the trailer allows for more maneuverability of the trailer when not being in use. The wheelchair user can disconnect he trailer and "shove it" into position and it will roll until it stops. This makes it easier for the wheelchair user to store the trailer. Also, because the trailer is in the upright position, the user can easily grab the bar section 30 to install onto the wheelchair.

The tube or bar section 30 that extends to the wheelchair can be formed so that it attaches to the right or left-hand side of the wheelchair. This makes it easier for the user to rotate the trailer to either side. This also makes it more convenient if one is a right or left-handed person.

Because of the unique attaching bar section 30, it is possible to rotate the basket 48 approximately 170° so that the basket 48 ends up directly at the side of the wheelchair making it much more convenient for the wheelchair user to place items into or remove items from the basket 48.

Although a preferred embodiment of the invention has been disclosed, variations thereof may occur to an artisan and the scope of the invention should only be limited by the scope of the appended claims.

I claim:

1. A trailer for quick releasable attachment to a wheelchair having at least one vertical support member comprising:

a pair of spaced side supports having a basket secured therebetween, each side support having a bottom end terminating in a rotatable wheel, said side supports being interconnected by a support bar; and a wheelchair connecting member connected to said support bar at a point of connection having a downwardly extending portion terminating in a rotatable wheel and an elongated portion extending from the point of connection of said support bar to said wheelchair connecting member terminating in an apertured end which may be releasably coupled to said wheelchair, said wheelchair connecting member, said downwardly extending portion and said elongated portion being of one integral piece of tubing.

2. In the trailer of claim 1 wherein said wheelchair connecting member is pivotally coupled to said support bar.

3. In the trailer of claim 1 wherein a quick release pin is releasably mounted in said aperture, said pin having a downwardly extending portion.

4. In the trailer of claim 1 wherein said basket is a wire basket secured to said side supports at a plurality of spaced locations.

5. In the trailer of claim 4 wherein said wire basket has a wire frame secured to said side supports by clamps.

6. In the trailer of claim 1 wherein said side supports and said support bar are of one integral piece of tubing.

7. In the trailer of claim 1 wherein said elongated portion is angled upwardly from the horizontal.

8. In the trailer of claim 7 wherein said angle is about 5°.

9. In the trailer of claim 1 wherein said elongated portion includes an elongated first portion having a longitudinal axis extending generally normal from the point of connection to said support bar, then angles outwardly at an angle with respect to the longitudinal axis of said first portion.

10. In the trailer of claim 9 wherein said angle is about 30°.

11. A combination trailer and wheelchair wherein the trailer is releasably attached to said wheelchair, said wheelchair having at least one vertical support member comprising:

a pair of spaced side supports having a basket secured therebetween, each side support having a bottom end terminating in a rotatable wheel, said side supports being interconnected by a support bar; and a wheelchair connecting member connected to said support bar at a point of connection having a downwardly extending portion terminating in a rotatable wheel and an elongated portion extending from the point of connection of said support bar to said wheelchair connecting member terminating in an apertured end which may be releasably coupled to said wheelchair, said wheelchair connecting member, said downwardly extending portion and said elongated portion being of one integral piece of tubing.

12. The combination of claim 11 wherein a quick release pin is releasably mounted in said aperture, said pin having a downwardly extending portion.

13. The combination of claim 12 wherein said vertical support member of said wheelchair has an apertured bearing member attached thereto, said pin being receivable in said apertured bearing member and pivotable thereabout.

14. The combination of claim 13 including said pin being receivable in an apertured bearing member, said bearing member having a screw portion receivable in an aperture in said vertical support member of said wheelchair.

* * * * *

UNITED STATES PATENT AND TRADEMARK OFFICE
CERTIFICATE OF CORRECTION

PATENT NO   : 5,794,957
DATED       : August 18, 1998
INVENTOR(S) : Stephen P. Mendon It is certified that error appears in the above-identified patent and that said Letters Patent is hereby corrected as shown below:

On title page, left-hand column, please delete field 73 ("Assignee") in its entirety.

Signed and Sealed this

Fifth Day of October, 1999

*Attest:*

Q. TODD DICKINSON

*Attesting Officer*   Acting Commissioner of Patents and Trademarks